United States Patent
Lodha et al.

(10) Patent No.: US 7,443,856 B2
(45) Date of Patent: Oct. 28, 2008

(54) MANAGING PROCESSING UTILIZATION IN A NETWORK NODE

(75) Inventors: Sandeep Lodha, Philadelphia, PA (US); Thirumalpathy Balakrishnan, Santa Clara, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 645 days.

(21) Appl. No.: 11/036,909

(22) Filed: Jan. 14, 2005

(65) Prior Publication Data
US 2005/0152335 A1 Jul. 14, 2005

Related U.S. Application Data

(60) Provisional application No. 60/536,469, filed on Jan. 14, 2004.

(51) Int. Cl.
*H04L 12/28* (2006.01)
(52) U.S. Cl. ..................................................... 370/392
(58) Field of Classification Search ........................ None
See application file for complete search history.

(56) References Cited

U.S. PATENT DOCUMENTS

| | | | |
|---|---|---|---|
| 7,103,055 B2* | 9/2006 | Kadambi et al. | 370/409 |
| 2003/0035430 A1* | 2/2003 | Islam et al. | 370/401 |
| 2003/0065812 A1* | 4/2003 | Beier et al. | 709/236 |
| 2004/0117438 A1* | 6/2004 | Considine et al. | 709/203 |
| 2004/0186904 A1 | 9/2004 | Oliveira | |

* cited by examiner

*Primary Examiner*—Duc C Ho (57) ABSTRACT

A technique for managing the utilization of processing resources involves filtering packets that are sent to a CPU for learning before allowing the packets to reach the CPU. The filtering involves determining if related packets have already been allowed to reach the CPU for learning and using the knowledge about related packets to determine if a current packet should be allowed to reach the CPU. In one embodiment, the processing resources of the CPU are conserved by allowing only one packet per flow to reach the CPU for learning. The one packet is used by the CPU to generate the necessary forwarding information and to initiate programming of the hardware-based forwarding table so that subsequent packets of the same flow can be forwarded directly from the hardware-based forwarding engine.

18 Claims, 5 Drawing Sheets

MANAGING PROCESSING UTILIZATION IN A NETWORK NODE

CROSS-REFERENCE TO RELATED APPLICATION

This application is entitled to the benefit of provisional U.S. Patent Application Ser. No. 60/536,469, filed 14 Jan. 2004.

FIELD OF THE INVENTION

The invention relates to packet-based communications networks, and more particularly, to techniques for managing the utilization of processing resources in a network node such as a switch or router.

BACKGROUND OF THE INVENTION

Packet-based network nodes, such as switches and routers, generate a database of forwarding information that is used to forward incoming packetized traffic. The forwarding information is generated through software-based protocols that are executed by a central processing unit (CPU). In order to increase the speed and throughput of switches and routers, the forwarding information is often programmed into hardware-based forwarding tables. The hardware-based forwarding tables can be rapidly searched to provide forwarding decisions without ever having to utilize the resources of the CPU. When forwarding information for a received flow of packets does not exist in the hardware-based forwarding table, the packets from the flow are sent to the CPU for processing until forwarding information can be learned and a forwarding table entry can be programmed into the hardware-based forwarding table. The CPU of a network node has a finite processing capacity and as more packets are sent to the CPU, more of the finite processing capacity is consumed by processing the received packets. If the load on the CPU is too great, the response time of the CPU will slow and some packets may be dropped.

Many of the most advanced switches and routers utilize a chassis-based distributed architecture in which separate linecards are dedicated to different functions. For example, a control module linecard is dedicated to central management and control operations, port interface linecards are dedicated to sending and receiving network traffic and performing hardware-based forwarding, and a switch fabric linecard is dedicated to providing data paths between the various linecards. In a distributed architecture, the control module includes a main CPU that is responsible for generating and managing the forwarding information for the entire network node and for programming the hardware-based forwarding tables of the port interfaces. The wide set of responsibilities of the control module makes the finite processing capacity of the main CPU a very valuable resource.

In view of the foregoing, what is needed is a technique for efficiently managing the utilization of processing resources in a packet-based network node.

SUMMARY OF THE INVENTION

A technique for managing the utilization of processing resources involves filtering packets that are sent to a CPU for learning before allowing the packets to reach the CPU. The filtering involves determining if related packets have already been allowed to reach the CPU for learning and using the knowledge about related packets to determine if a current packet should be allowed to reach the CPU. In one embodiment, the processing resources of the CPU are conserved by allowing only one packet per flow to reach the CPU for learning. The one packet is used by the CPU to generate the necessary forwarding information and to initiate programming of the hardware-based forwarding table so that subsequent packets of the same flow can be forwarded directly from the hardware-based forwarding engine. Because only one packet per flow is allowed to reach the CPU for learning, the processing resources of the CPU are not consumed by learning the same forwarding information for multiple packets of the same flow.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION

Figure 1:
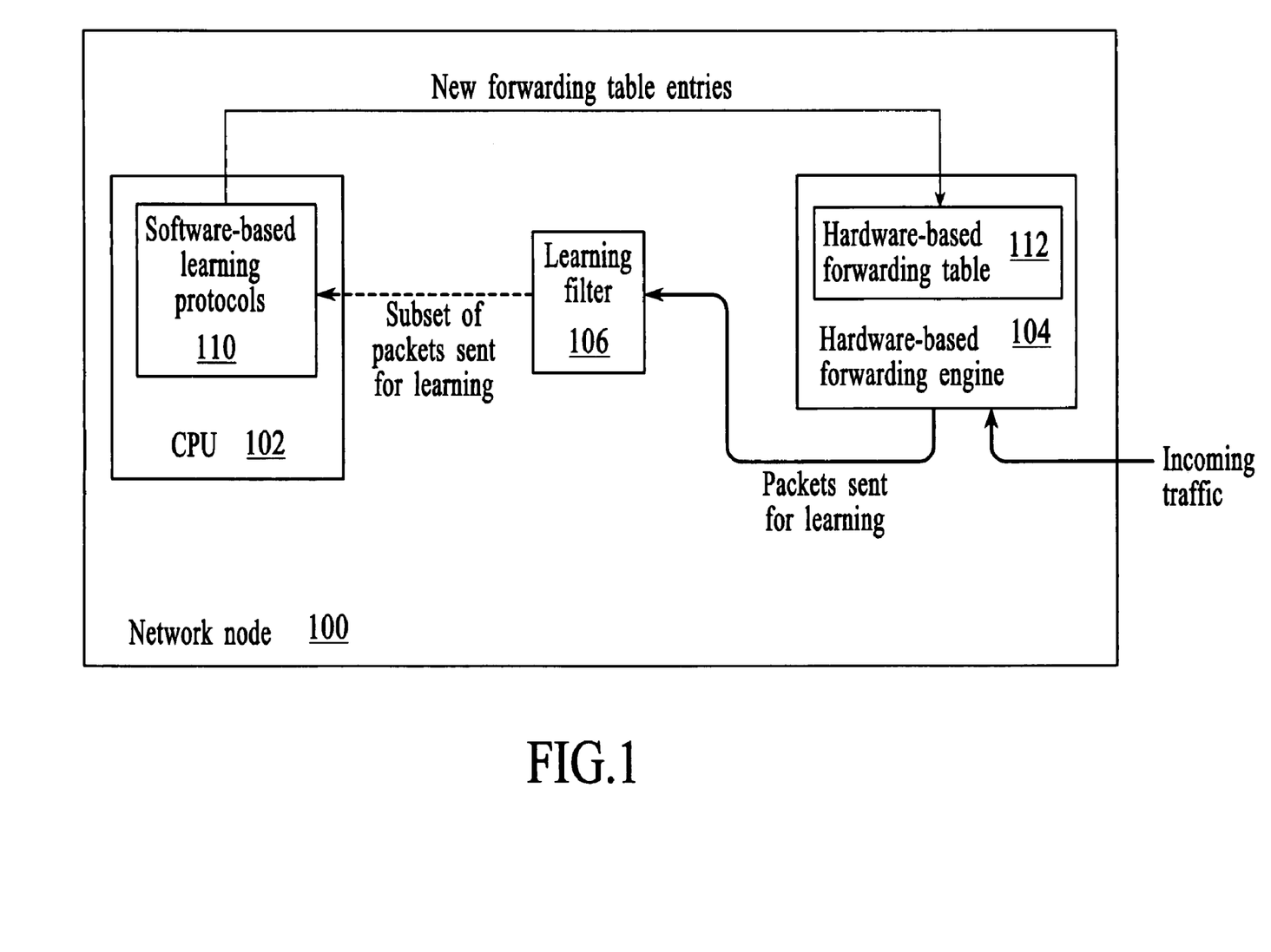
FIG. 1 depicts a network node that includes a CPU, a hardware-based forwarding table, and a learning filter.

FIG. 1 depicts a network node 100 that includes a central processing unit (CPU) 102, a hardware-based forwarding engine 104, and a learning filter 106. The network node handles traffic in discrete segments, often referred to as datagrams. In an embodiment, the network node is an Ethernet switch/router that forwards traffic within the network node using Layer 2, Layer 3, and/or Layer 4 header information, where the "Layers" are defined in the Open System Interconnection (OSI) model by the International Standardization Organization (ISO). The network node may include port interfaces that support other network protocols such as asynchronous transfer mode (ATM), synchronous optical network (SONET), and Frame Relay. Although an Ethernet-based switch/router is described, the disclosed techniques can be applied to network nodes that utilize other protocols to transfer traffic.

The CPU 102 of the network node 100 runs an operating system and supports software protocols that are necessary to forward network traffic. The CPU may be embodied as a multifunction processor and/or an application-specific processor. Examples of processors include the PowerPC™ family of processors by IBM and the x86 family of processors by Intel. Examples of operating systems that may be run by the CPU include NetBSD, Linux, and vxWORKS. Although not shown, the CPU may be supported by other hardware (e.g., memory and application-specific integrated circuits (ASICs)).

Among the protocols run by the CPU 102 are the protocols involved with generating forwarding information. These protocols, referred to herein as software-based learning protocols 110, include Layer 2 learning protocols and Layer 3 learning protocols. In the embodiment of FIG. 1, the Layer 2 protocol that is used to switch traffic is Ethernet and Layer 2 learning involves associating a destination media access control (MAC) address with an output port of the network node. A destination MAC address is associated with an output port of the network node by learning the input port and source MAC address of received packets. As is well-known in the field, the correct output port for a destination MAC address can be learned by "flooding" packets with the destination MAC address to be learned onto all of the relevant output ports and then watching to see the port on which a corresponding packet is received. Layer 2 learning may also involve associating virtual local area network (VLAN) identifiers (IDs) with destination MAC addresses and/or output ports.

In the embodiment of FIG. 1, the Layer 3 protocol that is used to route traffic is Internet Protocol (IP)-based (including IP and IPX) and Layer 3 learning involves associating a destination IP address with a next-hop IP address. Examples of common Layer 3 protocols that are run by the CPU 102 include the open shortest path first (OSPF) protocol, the border gateway protocol (BGP), the intermediate system-to-intermediate system (ISIS) protocol, and multiprotocol label switching (MPLS).

Traffic is typically communicated between packet-based network nodes in groups of related packets. The groups of related packets are often referred to as a "flow." Packets of a flow have some common information. For example, common Layer 2 information may include any combination of a destination MAC address, a source MAC address, a VLAN ID, and/or a port of entry. Common Layer 3 information may include any combination of a destination IP address, a source IP address, type of service (TOS), a destination port number, and/or a source port number.

The hardware-based forwarding engine 104 of FIG. 1 is responsible for making hardware-based forwarding decisions for incoming traffic. The hardware-based forwarding engine includes a hardware-based forwarding table 112 that is programmed with forwarding table entries. The forwarding table entries associate incoming packet information with output information. As is known in the field, hardware-based forwarding tables are typically embodied in random access memory (RAM) and/or content addressable memory (CAM) that can be rapidly accessed and searched. Hardware-based forwarding decisions can only be made on incoming packets if the respective hardware-based forwarding table contains forwarding information that corresponds to the incoming packets. In operation, the hardware-based forwarding engine compares header information from received packets to the forwarding table entries to look for a table entry match. If the hardware-based forwarding engine is not able to make a forwarding decision on the incoming packets, then the hardware-based forwarding table needs to be programmed with a forwarding table entry that corresponds to the incoming packets. The process of obtaining forwarding information is referred to herein as learning. In some embodiments, the hardware-based forwarding table may contain forwarding information that corresponds to the incoming packets although for some reason, the forwarding information is inactive (e.g., cannot be used to make a forwarding decision). When forwarding information is inactive, no forwarding decision can be made and the related packets are sent to the CPU for learning.

Since traffic is typically communicated in a flow of packets, if the hardware-based forwarding engine 104 is not able to make forwarding decisions on the incoming packets, then all of the packets of the flow are sent to the CPU 102 for forwarding until the CPU communicates forwarding information to the hardware-based forwarding engine and the forwarding table is programmed with the necessary forwarding information. The more packets that are sent to the CPU for processing, the longer the delay in processing can be. If the processing delay is too long, packets may be dropped. Delays in processing and dropped packets negatively affect the performance of the network node.

In accordance with an embodiment of the invention, packets that are sent to the CPU 102 for learning are filtered before being allowed to reach the CPU. The filtering involves determining if related packets have already been allowed to reach the CPU and using the knowledge about related packets to determine if a current packet should be allowed to reach the CPU. In one embodiment, the resources of the CPU are conserved by allowing only one packet per flow to reach the CPU for learning. The one packet is used by the CPU to generate the necessary forwarding information and to initiate programming of the hardware-based forwarding table 112 so that subsequent packets of the same flow can be forwarded directly from the hardware-based forwarding engine 104. Because only one packet per flow is allowed to reach the CPU for learning, the processing resources of the CPU are not consumed by learning the same forwarding information for multiple packets of the same flow.

In the embodiment of FIG. 1, the filtering of packets that are sent to the CPU 102 for learning is performed by the learning filter 106. The learning filter receives all of the packets that are sent from the hardware-based forwarding engine 104 to the CPU for learning and determines which of the received packets are allowed to reach the CPU. Only a subset of the originally sent packets is allowed to reach the CPU as a result of the filtering. The learning filter may use a variety of techniques to determine which of the received packets are allowed to reach the CPU. Some examples of the learning filter and filtering techniques are described below. In the embodiment of FIG. 1, the learning filter is an ASIC chip that is located in a data path between the CPU and the hardware-based forwarding engine.

Figure 2:
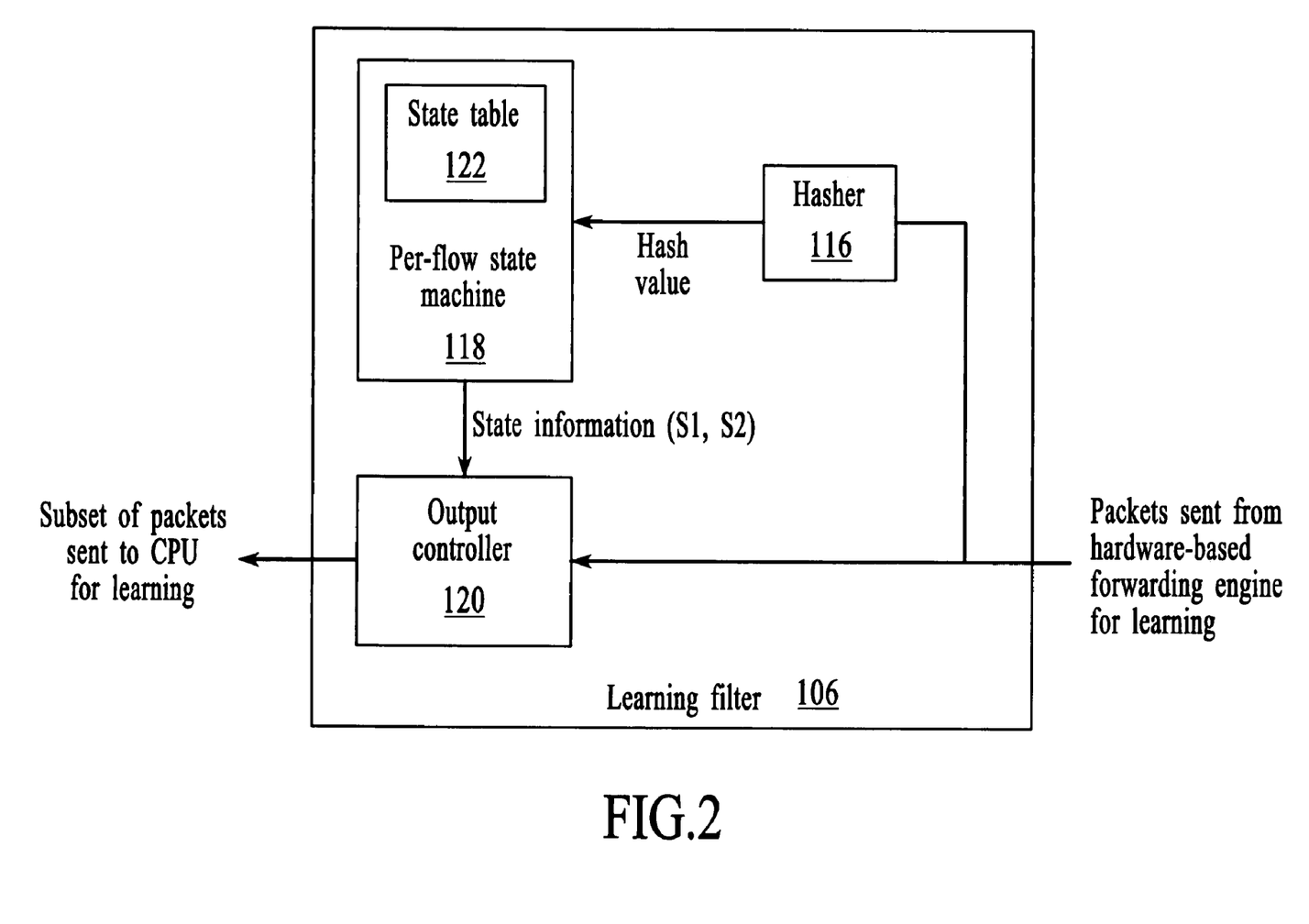
FIG. 2 depicts an embodiment of the learning filter from FIG. 1.

FIG. 2 depicts an embodiment of the learning filter 106 from FIG. 1. The learning filter includes a hasher 116, a per-flow state machine 118, and an output controller 120. The learning filter receives packets that are sent by the hardware-based forwarding engine 104 to the CPU 102 for learning. The hasher obtains header information from the received packets and hashes certain header information to generate hash values that identify the flows to which the packets belong. For example, Layer 2 packets are hashed on a combination of the destination MAC address, the source MAC address, the VLAN ID, and the port of entry while Layer 3 packets are hashed on the destination IP address, source IP address, TOS, destination port number, and source port number. Although some examples of hashing fields are described, other fields or combinations of fields are possible. The hash value generated by the hasher is provided to the per-flow state machine. The per-flow state machine maintains a state table 122 that indicates a state for each identified flow, where each flow is identified by a hash value. The current state of a flow is provided to the output controller. The output controller determines whether or not a packet is allowed to reach the CPU based on the current state. As a result of the filtering that takes place, only a subset of the packets that were received by the learning filter are allowed to reach the CPU.

In the embodiment of FIG. 2, the per-flow state machine 118 maintains two states for each flow, where the states are identified as state 1 (S1) and state 2 (S2). State 1 indicates that no packets from the corresponding flow have been allowed to reach the CPU 102 and state 2 indicates that a packet of the corresponding flow has been allowed to reach the CPU. In the embodiment of FIG. 2, the state of a flow is initially set to state 1 and a packet is allowed to reach the CPU when the state is state 1. Once a packet is allowed to reach the CPU, the state is changed to state 2. While the state of a flow is set to state 2, no more packets from the flow are allowed to reach the CPU. The state of a flow can be reset to state 1 according to a pre-established algorithm to ensure that the forwarding information of flows is periodically updated. For example, the state machine may be configured to reset to state 1 after the forwarding table is programmed with the corresponding table entry or after some fixed period of time. The result of the learning filter logic of FIG. 2 is that only one packet per flow is allowed to reach the CPU for processing. This can greatly reduce the load on the CPU without inhibiting the learning process. Although one example of the learning filter and filtering logic is described, other filtering techniques may be used to reduce the number of packets that are allowed to reach the CPU for learning.

Figure 3:
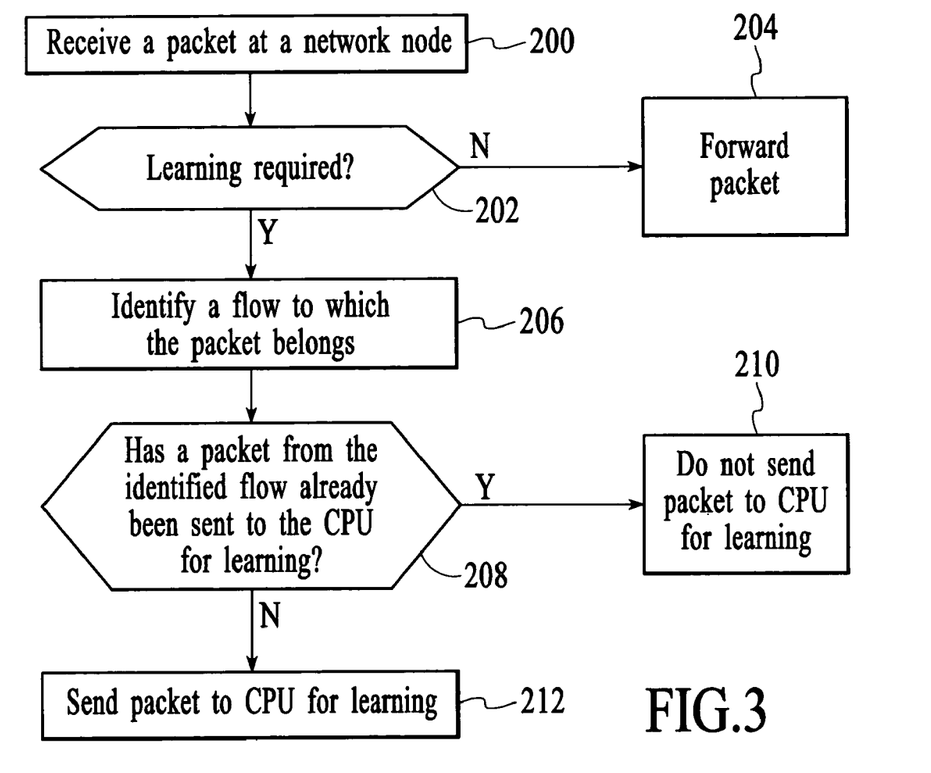
FIG. 3 depicts a process flow diagram of a technique for managing the utilization of processing resources.

FIG. 3 depicts a process flow diagram of a technique for managing the utilization of processing resources of a CPU. At block 200, a packet is received at a network node. At decision point 202, it is determined whether or not learning is required. If it is determined that learning is not required, then at block 204 the packet is forwarded by the hardware-based forwarding engine using forwarding information that exists in its hardware-based forwarding table. If it is determined that learning is required, then at block 206, the flow to which the packet belongs is identified. For example, the flow is identified by hashing certain fields of the packet header. After the flow is identified, at decision point 208, it is determined if a packet from the identified flow has already been sent to the CPU for learning. For example, a state machine is consulted to determine whether a packet from the identified flow has already been sent to the CPU for learning. If a packet from the identified flow has already been sent to the CPU for learning, then the current packet is not sent to the CPU for learning (block 210). If a packet from the identified flow has not already been sent to the CPU for learning, then the current packet is sent to the CPU for learning (block 212). The process flow of FIG. 3 is repeated for each packet that is received at the network node.

Figure 4:
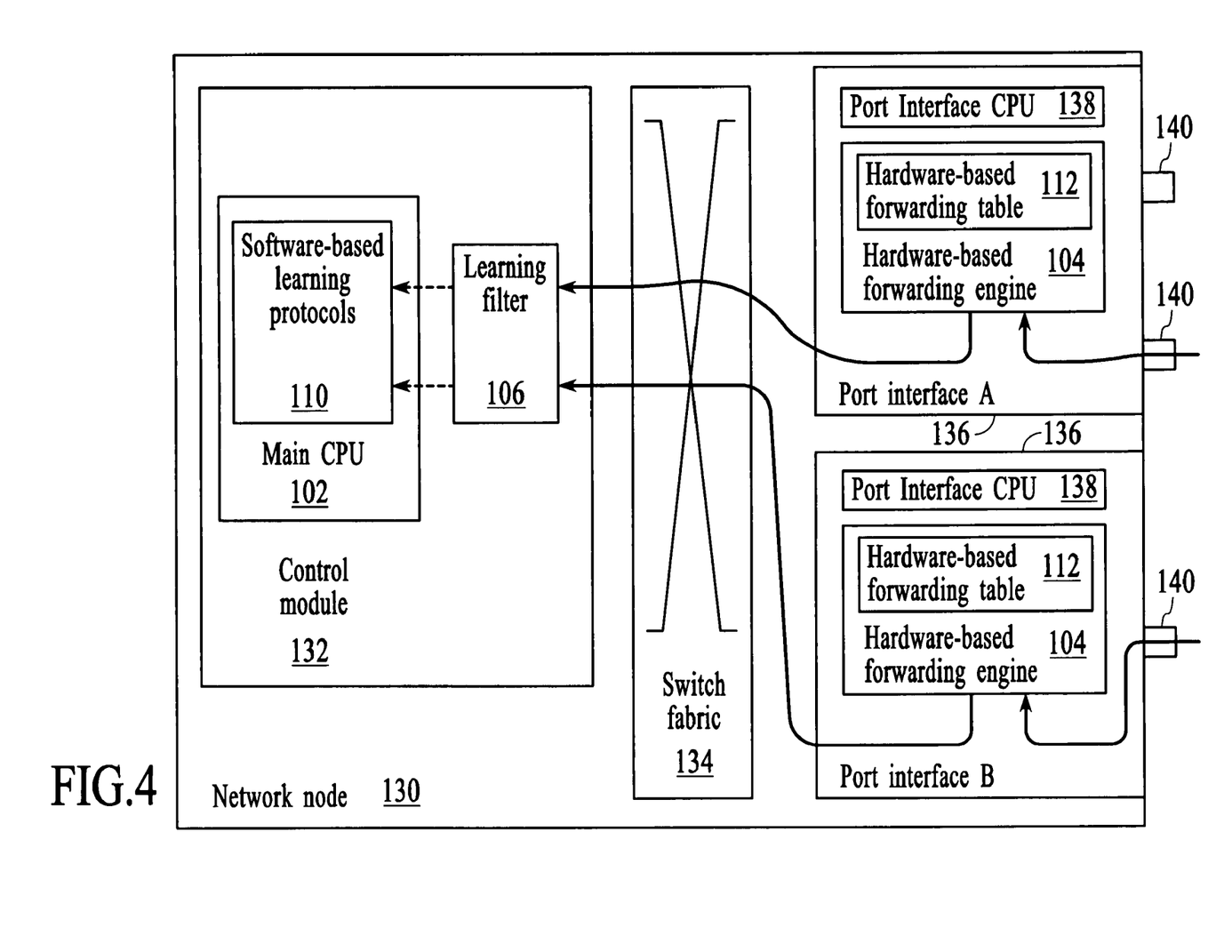
FIG. 4 depicts an embodiment of a network node with a distributed architecture that is configured to filter packets that are sent for learning.

FIG. 4 depicts an embodiment of a network node 130 with a distributed architecture that is configured to filter packets that are sent for learning. The distributed architecture of the network node includes a control module linecard 132, a switch fabric linecard 134, and two port interface linecards 136 (port interfaces A and B). In the embodiment of FIG. 4, a single learning filter 106 is located at the control module to filter packets received from all of the port interfaces. The learning filter depicted in FIG. 4 performs the same filtering functions as the learning filter that is described above with reference to FIGS. 1 and 2.

The control module 132 includes a CPU 102 (identified as the "main CPU") and the learning filter 106. In general, the control module supports various functions such as network management functions and protocol implementation functions. Although not shown, the control module also includes memory such as electrically erasable programmable read-only memory (EEPROM) or flash ROM for storing operational code and dynamic random access memory (DRAM) for buffering traffic and storing data structures, such as forwarding information. In addition, there may be more than one discrete processor unit and more than one memory unit on the control module. The main CPU may include a multifunction processor and/or an application-specific processor as described above. The main CPU supports the software-based learning as indicated by the software-based learning protocols functional block 110. The software-based learning includes generating Layer 2 and Layer 3 forwarding information as is well-known in the field.

The switch fabric 134 provides datapaths between the control module 132 and the port interfaces 136 (e.g., datapaths between the control module and the port interfaces and datapaths between the port interfaces). The switch fabric may utilize, for example, shared memory, a shared bus, or crosspoint matrices.

The port interfaces 136 include a port interface CPU 138, a hardware-based forwarding engine 104, and input/output ports 140. In general, functions performed by the port interfaces include receiving traffic into the network node, buffering traffic, storing forwarding information, protocol processing, making forwarding decisions, and transmitting traffic from the network node 130. In the embodiment of FIG. 4, the port interface CPU of each port interface runs its own operating system. The port interface CPU within each port interface linecard may include a multifunction processor (e.g., an IBM PowerPC® processor) and/or an application specific processor. Operational code is typically stored in non-volatile memory (not shown) such as EEPROM or flash ROM while traffic is typically buffered in volatile memory (not shown) such as RAM.

The hardware-based forwarding engines 104 depicted in FIG. 4 perform the same functions as the hardware-based forwarding engine described with reference to FIG. 1. One task performed by the hardware-based forwarding engine is determining if incoming packets need to be learned so that forwarding decisions can be made directly by the hardware-based forwarding engines. Packets that need to be learned are sent to the control module 132 through the switch fabric 134.

In operation, the hardware-based forwarding engines 104 of the port interfaces 136 determine if received packets need learning. If received packets need learning, then the packets are sent across the switch fabric 134 to the control module 132. At the control module, the packets are first processed by the learning filter 106. The learning filter acts as a gateway that determines whether or not the packets reach the main CPU 102 for learning. Because the learning filter is located on the control module, it can receive packets from all of the different port interfaces and therefore functions as a central filtering point. This enables all of the filtering to be accomplished with a single learning filter ASIC. Additionally, this enables the filtering to be accomplished without requiring changes to the main CPU or the hardware-based forwarding engines.

Figure 5:
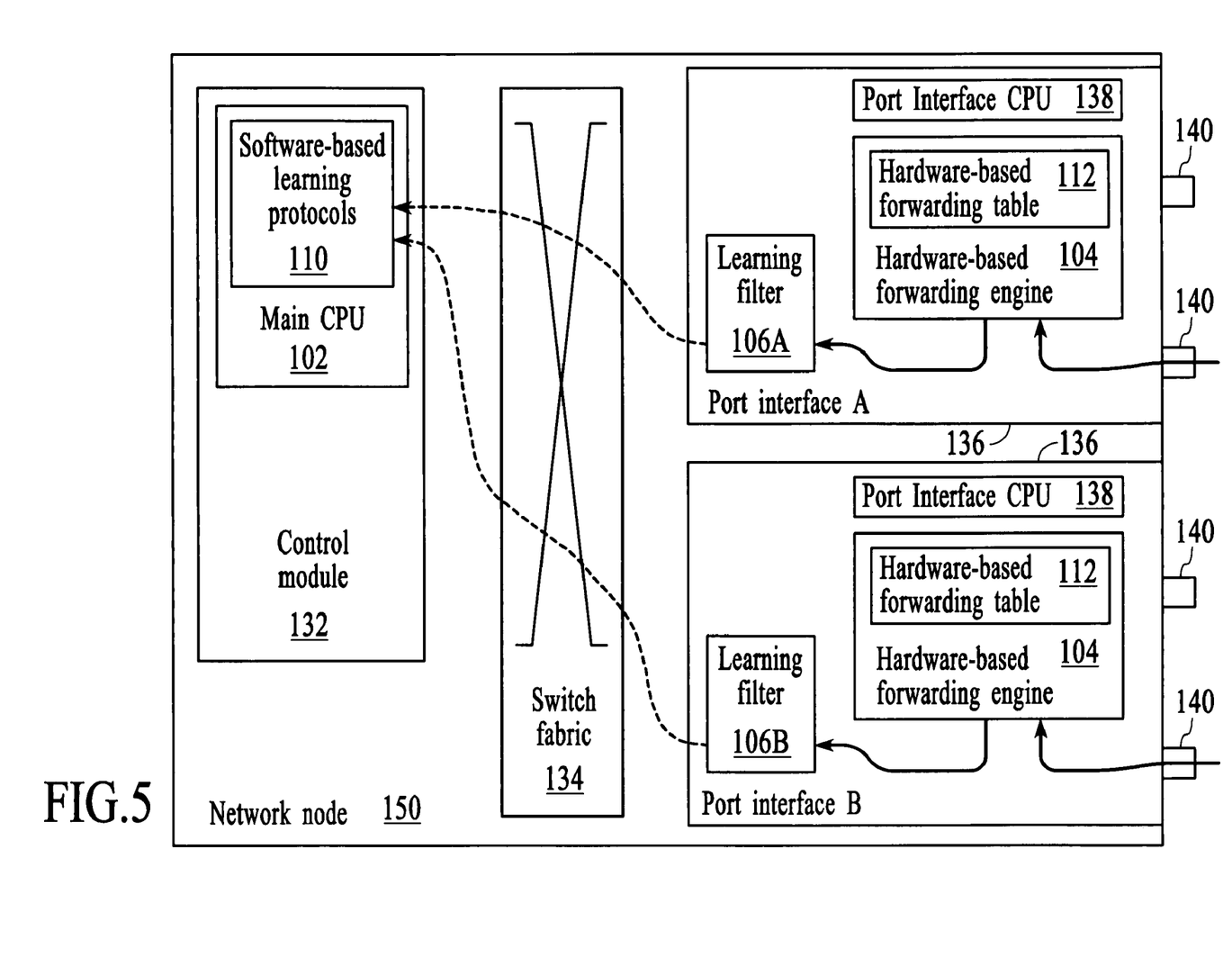
FIG. 5 depicts another embodiment of a network node with a distributed architecture.

FIG. 5 depicts another embodiment of a network node 150 with a distributed architecture. The embodiment of FIG. 5 is similar to the embodiment of FIG. 4 except that the filtering function is performed in a distributed manner at each port interface 136. In particular, each port interface includes an interface-specific learning filter 106A and 106B that filters only packets from its corresponding port interface. The interface-specific learning filters perform the same basic functions as the learning filter described with reference to FIGS. 1 and 2. Packets that pass the filtering are sent from the respective port interfaces to the main CPU 102 of the control module 132 through the switch fabric.

Figure 6:
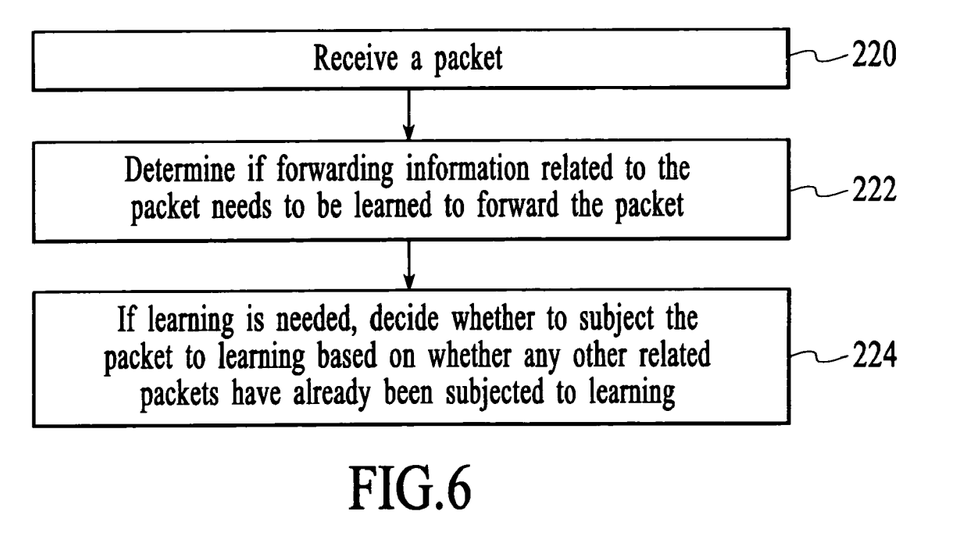
FIG. 6 depicts a process flow diagram of a method for managing the utilization of processing resources of a CPU.

FIG. 6 depicts a process flow diagram of a method for managing the utilization of processing resources of a CPU. At block 220, a packet is received. At block 222, it is determined if forwarding information related to the packet needs to be learned to forward the packet. At block 224, if learning is needed, a decision is made whether to subject the packet to learning. The decision is based on whether any other related packets have already been subjected to learning.

In the embodiment described herein, only packets that pass the filtering are sent to the CPU 102 for processing. In an alternative embodiment, the filtering function may be incorporated into the CPU such that all packets sent for learning are received by the CPU but only selected packets are subjected to learning processing.

Although in one embodiment only one packet per flow is allowed to reach the CPU 102, in other embodiments, the number of packets allowed to reach the CPU is reduced from the total number of packets of a flow that are initially sent to the CPU for learning.

In an embodiment, sending a packet within the network node may involve sending only header information of the packet. For example, sending a packet to the CPU for learning may involve sending only header information of the packet to the CPU.

Additionally, although in one embodiment the first packet of a flow is allowed to reach the CPU for learning, in other embodiments it is possible that a packet other than the first packet is allowed to reach the CPU.

Although specific embodiments of the invention have been described and illustrated, the invention is not to be limited to the specific forms or arrangements of parts as described and illustrated herein. The invention is limited only by the claims.

What is claimed is:

1. A method for managing the utilization of processing resources in a packet-based network node comprising:
    receiving a packet;
    determining if forwarding information related to the packet needs to be learned to forward the packet;
    if learning is needed, deciding whether to subject the packet to learning based on whether any other related packets have already been subjected to learning;
    wherein deciding whether to subject the packet to learning comprises:
        identifying a flow to which the packet belongs;
        determining whether a packet from the same flow has already been subjected to learning; and
        subjecting the packet to learning only if it is determined that a packet from the same flow has not already been subjected to learning.

2. The method of claim 1 wherein determining if forwarding information related to the packet needs to be learned comprises comparing header information of the packet to entries in a hardware-based forwarding table to find a match.

3. The method of claim 2 wherein learning is needed if no match is found in the comparison of the header information to entries in the hardware-based forwarding table.

4. The method of claim 1 wherein identifying a flow to which the packet belongs involves hashing header information of the packet to produce a hash value and wherein determining whether a packet from the same flow has already been subjected to learning comprises indexing a state table using the hash value to obtain state information.

5. The method of claim 4 wherein the state information indicates whether a packet from the flow has already been subjected to learning.

6. The method of claim 1 further comprising sending the packet to a central processing unit (CPU) for processing if it is determined that the packet should be subjected to learning.

7. A system for managing the utilization of processing resources in a packet-based network node comprising:
    a central processing unit (CPU) configured to learn forwarding information that is used to forward packets;
    a hardware-based forwarding engine configured to determine whether a packet should be sent to the CPU for learning; and
    a learning filter configured to receive packets from the hardware-based forwarding engine that are determined by the hardware-based forwarding engine to need learning and to decide whether to allow the received packets to reach the CPU based on whether any other related packets have already been allowed to reach the CPU;
    wherein related packets are packets from the same flow of packets and wherein the learning filter comprises a hasher that is comfigured to identify a flow to which the packet belongs and a state table for indicating whether a packet from an identified flow has already been sent to the CPU, wherein the hasher generates a hash value that identifies a flow and wherein the hash value is used to index the state table.

8. The system of claim 7 wherein the hardware-based forwarding engine includes a hardware-based forwarding table that can be programmed with forwarding table entries and wherein the hardware-based forwarding engine is configured to send a packet to the CPU for learning when the hardware-based forwarding engine does not contain forwarding information corresponding to the received packet.

9. The system of claim 7 wherein the learning filter is configured to allow a reduced number of packets from a flow to reach the CPU.

10. The system of claim 7 wherein the CPU and learning filter are located on a control module linecard and the hardware-based forwarding engine is located on a port interface linecard, the system further including a plurality of port interface linecards each having a hardware-based forwarding engine, wherein the learning filter is configured to receive packets from each of the port interface linecards.

11. The system of claim 7 wherein the CPU is located on a control module linecard and the learning filter is located along with the hardware-based forwarding engine on a port interface linecard, the network node further comprising a plurality of port interface linecards, each port interface linecard including a learning filter.

12. A method for managing the utilization of processing resources in a packet-based network node comprising:
    receiving a packet;
    sending the packet to a central processing unit (CPU) for learning;
    before the packet reaches the CPU;
        determining if a related packet has already been allowed to reach the CPU for learning;
        deciding whether to allow the packet to reach the CPU based on whether a related packet has already been allowed to reach the CPU;
    wherein determining if a related packet has already been allowed to reach the CPU for learning comprises:
    identifying a flow to which the packet is associated;
    determining whether a packet from the same flow has been allowed to reach the CPU; and
    allowing the received packet to reach the CPU for learning only if another packet from the same flow has not already been allowed to reach the CPU for learning.

13. The method of claim 12 further comprising allowing a reduced number of packets from the same flow to reach the CPU for learning.

14. The method of claim 12 wherein determining if a related packet has already been allowed to reach the CPU for learning comprises hashing header information of the received packet to produce a hash value and indexing a state table using the hash value, wherein the table includes state information that indicates whether a related packet has already been allowed to reach the CPU.

15. A method for managing the utilization of processing resources in a packet-based network node comprising:
   receiving a packet;
   determing if forwarding information related to the packet needs to be learned to forward the packet;
   if learning is needed, deciding whether to subject the packet to learning based on whether any other related packets have already been subjected to learning;
   wherein deciding whether to subject the packet to learning comprises:
      identifying a flow to which the packet belongs;
      determining whether a packet from the same flow has already been subjected to learning; and
      subjecting the packet to learning only if it is determined that a packet from the same flow has not already been subjected to learning;
      wherein deciding whether to subject the packet to learning comprises identifying a flow to which the packet belongs and determining whether a packet from the same flow has already been subjuected to learning; and
      wherein identifying a flow to which the packet belongs involves hashing header information of the packet to produce a hash value and wherein determining whether a packet from the same flow has already been subjected to learning comprises indexing a state table using the hash value to obtain state information.

16. A system for managing the utilization of processing resources in a packet-based network node comprising:
   a central processing unit (CPU) configured to learn forwarding informatiion that is used to forward packets;
   a hardware-based forwarding engine configured to determine whether a packet should be sent to the CPU for learning; and
   a learning filter configured to receive packets from the hardware-based forwarding engine that are determined by the hardware-based forwarding engine to need learning and to decide whether to allow the received packets to reach the CPU based on whether any other related packets have already been allowed to reach the CPU;
   wherein the CPU and learning filter are located on a control module linecard and the hardware-based forwarding engine is located on a port interface linecard, the system further including a plurality of port interface linecards each having a hardware-based forwarding engine, wherein the learning filter is configured to receive packets from each of the interface linecards.

17. A system for managing the utilization of processing resources in a packet-based network node comprising:
   a central processing unit (CPU) configured to learn forwarding information that is used to forward packets;
   a hardware-based forwarding engine configured to determine whether a packet should be sent to the CPU for learning; and
   a learning filter configured to received packets from the hardware-based forwarding engine that are detemined by the hardware-based forwarding engine to need learning and to decide whether to allow the received packets to reach the CPU based on whether any other related packets have already been allowed to reach the CPU;
   wherein the CPU is located on a control module linecard and the learning filter is located along with the hardware-based forwarding engine on a port interface linecard, the network node furhter comprising a plurality of port interface linecards, each port interface linecard including a learning filter.

18. A method for managing the utilization of processing resources in a packet-based network node comprising:
   receiving a packet;
   sending the packet to central processing unit (CPU) for learning;
   before the packet reaches the CPU;
      determining if a related packet has already been allowed to reach the CPU for learning;
      deciding whether to allow the packet to reach the CPU based on whether a related packet has already been allowed to reach the CPU;
      wherein determining if a related packet has already been allowed to reach the CPU for learning comprises hashing header information of the received packet to produce a hash value and indexing a state table using the hash value, wherein the state table includes state information that indicated whether a related packet has already been allowed to reach the CPU.

* * * * *